Figure 1:
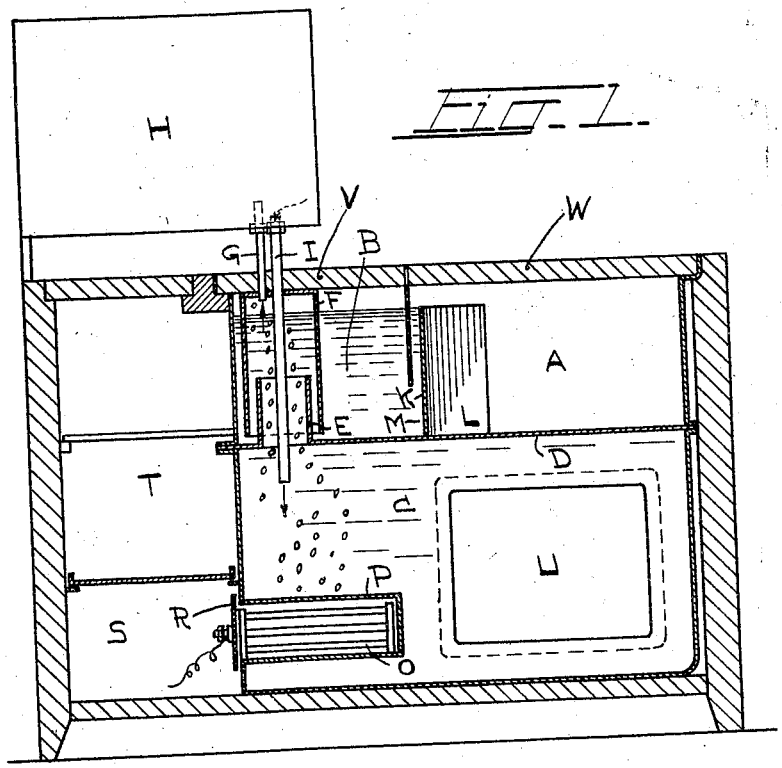

Oct. 23, 1923.

A. SAXEGAARD 1,471,573

APPARATUS FOR HOUSEHOLD COOKING

Filed Jan. 23, 1922

Inventor.
Andreas Saxegaard,
By ....... atty.

Patented Oct. 23, 1923.

1,471,573

UNITED STATES PATENT OFFICE.

ANDREAS SAXEGAARD, OF CHRISTIANIA, NORWAY.

APPARATUS FOR HOUSEHOLD COOKING.

Application filed January 23, 1922. Serial No. 531,205.

*To all whom it may concern:*

Be it known that I, ANDREAS SAXEGAARD, a subject of the King of Norway, residing at Christiania, Norway, have invented certain new and useful Improvements in Apparatus for Household Cooking; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention has for its object to provide improvements in apparatus for household cooking of the kind in which the cooking vessels are heated by means of a water bath maintained at a suitable temperature by electric means.

As these domestic cookers have been constructed hitherto, certain practical drawbacks are connected therewith partly as regards the arrangement of the water reservoirs and partly as regards the electric devices. According to the present invention improvements are made for the purpose of facilitating the daily attendance of the same and avoiding as much as possible professional assistance for keeping the electrical appliances in order.

In known domestic cookers the cooking vessels are let down into the water circulating around the electric heating devices. As the bottom of the water reservoir becomes dirty owing to careless handling of the food vessels, and the settling of the mud in the water a cleaning and rinsing of the reservoir from time to time becomes necessary. This is not only troublesome but also causes loss of heat, because all the heat-storing water must be drawn off and a new quantity of cold water be again brought up to a high temperature. In addition thereto the cooker is out of operation for several hours.

In the previous construction the cooking vessels rest upon a perforated plate arranged at a suitable distance below the level of the storage water. In the present construction a partition is provided so that the water on top of this partition, and in which the cooking vessels are let down, is separated from the heat storing water, the latter being enclosed within a subjacent container, wherein the heating elements are arranged and from which the heat is transmitted through the partition to the water, in which the cooking vessels are placed. Thus no fluid or solid matter from the cooking vessels can find its way down into the heat storage-space, it will settle within the upper space and may be very easily removed therefrom at any time.

Other improvements will be more specifically described with reference to the annexed drawings, which illustrate a preferred form for carrying out the invention.

Figure 2:
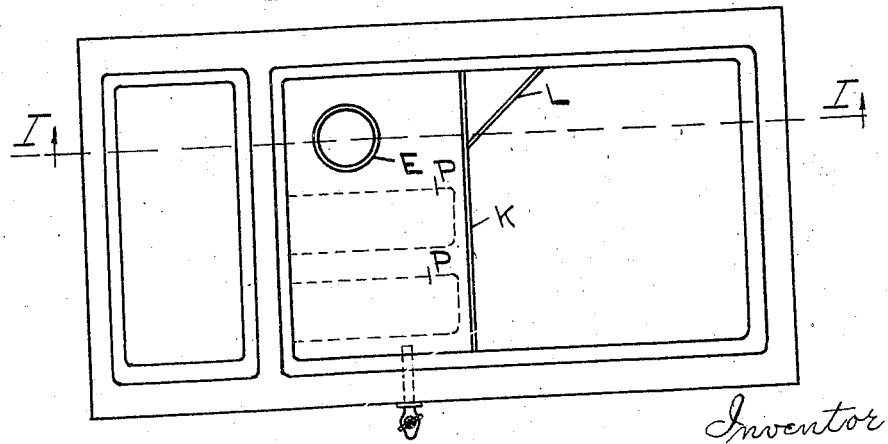

Fig. 1 is a vertical longitudinal section of the cooker on the line I—I on Fig. 2. Fig. 2 is a plan of the same, the top covers being removed. In the drawing A designates the cooking space and B the space containing water for house-hold use. Below these two spaces is arranged the reservoir C for the heat storing water, the partition D separating the reservoir from the spaces A and B. The reservoir C has an opening at the top extending in the form of a tube E into the space B. The tube E projects into a hood F fastened to the top cover V and from the top of the hood F a pipe G is carried up to the condenser or radiator H, from the bottom of which a pipe I leads down into the reservoir C. By this means steam generated in the reservoir C may escape through the tube E, hood F and pipe G into the radiator H, where it is condensed, the water of condensation returning through the pipe I into the reservoir C.

The tube E and the hood F, which latter has a greater diameter than the tube E, form together as shown in the drawing a water-trap, so that no steam from the reservoir C can enter into the compartments above the partitions D.

The two compartments A and B are separated from each other by means of the partition K. This partition has at its lower end an opening M, through which the compartment B communicates with a compartment formed by a diagonally placed wall L in the compartment A, said wall terminating at a certain distance from the top of the compartment A and forming a water-trap in the corner between B and A.

When the cooker is being used the reservoir C is full of water and in the compartment B the water level reaches to the upper edge of the corner wall L, whereas in the compartment A there is only a few inches water, as shown.

The water in the compartment B being for household use, it will be consumed in the course of the day, there being a cock as shown, for drawing off the water. In the evening fresh water is filled into this compartment by lifting the cover W on the cooking compartment and pouring water into the small compartment behind the wall L. It is therefore not necessary to open the compartment B.

The water in the cooking space and in the household water compartment is heated from the reservoir C and therefore it will never reach the boiling temperature, but remains at least one degree below the same. This is an advantage for the reason that steam can not be evolved within the cooking space. This feature makes it unnecessary to provide the cover on top of the cooking space with a water-trap arrangement to prevent the escaping of steam and heat. As there is so very little water in the compartment A, it is very easy every day to clean out the same, if it should be necessary.

Another improvement shown in the drawings is the arrangement of the heating elements for the water reservoir C. Usually such heating elements have been placed in direct contact with the water. As however, such heating elements sometimes get out of order, they have to be exchanged and it has then been necessary to call for professional assistance. According to the present invention the heating elements O are placed in pockets P projecting laterally from one side of the reservoir into the water. These pockets are closed by means of a cover R. Arranged in this manner it is an easy matter for anybody to exchange a heating element. These pockets P preferably enter the water space from an airspace S arranged in the cooker below the chamber T provided for keeping food warm or for warming dishes. In this space S all the electrical connections of the cooker may be mounted, so that they are out of the way and kept in a closed space, where they are not liable to be molested.

U is the oven of the cooker which as usual is heated by electrical means independently of the other heating means, which arrangements form no part of this invention.

Claims:

1. A domestic cooker, comprising a casing, a horizontal portion therein forming superposed water receptacles, a cooking chamber formed in the upper receptacle, means in the lower receptacle for heating the water therein, and means to allow water and steam to rise from the lower receptacle without passing into the cooking chamber.

2. In a domestic cooker, a horizontal partition mounted therein forming superposed water receptacles, means in the lower chamber for electrically heating the water therein, means dividing the upper receptacle into compartments, and a water trap between the superposed water receptacles.

3. In a domestic cooker, a horizontal partition mounted therein forming superposed water receptacles, means in the lower chamber for electrically heating the water therein, means dividing the upper receptacle into compartments, a water trap between the superposed water receptacles, and a water trap through which the compartments communicate with each other.

4. In a domestic cooker, superposed water receptacles formed therein, a water trap connecting the receptacles, a cooking compartment, and a water-trap connecting the compartment with one of the water receptacles.

5. In a domestic cooker, superposed water receptacles formed therein, a water-trap connecting the receptacles, a cooking compartment, a water-trap connecting the compartment with one of the water receptacles, and means in the lower water receptacle for electrically heating the water.

6. A domestic cooker comprising a water reservoir, means for heating the water therein, a water receptacle and a cooking receptacle above the reservoir, a water trap through which the latter communicates with the water receptacle, a steam condenser communicating with the water trap, a water return conduit connecting the condenser and reservoir, and a water-trap connecting the water and cooking receptacles.

7. A domestic cooker comprising a water reservoir, a water receptacle above the latter, a tube communicating with the reservoir and extending into the receptacle, a hood surrounding the tube above the bottom of the receptacle, a condenser above the latter, a tube communicating with the hood and condenser, a tube communicating with the latter and reservoir, and means to heat the water in the reservoir.

8. A domestic cooker comprising a water reservoir, a water receptacle above the latter, a tube communicating with the reservoir and extending into the receptacle, a hood surrounding the tube above the bottom of the receptacle, a condenser above the latter, a tube communicating with the hood and condenser, a tube communicating with the latter and reservoir, means to heat the water in the reservoir, a cooking receptacle above the latter, and a water-trap connecting the cooking and water receptacles.

9. A domestic cooker comprising a water reservoir, a water receptacle arranged above and communicating with the reservoir, a cooking receptacle communicating with the water receptacle, a compartment arranged laterally of the reservoir, a pocket extending into the latter communicating with the compartment, and heating elements mounted in the pocket.

In testimony that I claim the foregoing as my invention, I have signed my name in presence of two subscribing witnesses.

ANDREAS SAXEGAARD.

Witnesses:
JAMES J. FOLEY,
DAGNY SYVERSEN.